July 19, 1927.
A. L. RYAN
1,636,077
PRESSURE GAUGE
Filed May 25, 1926
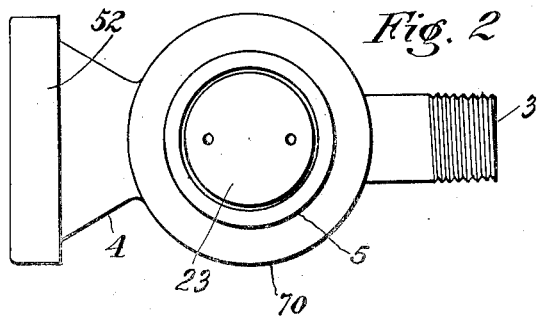
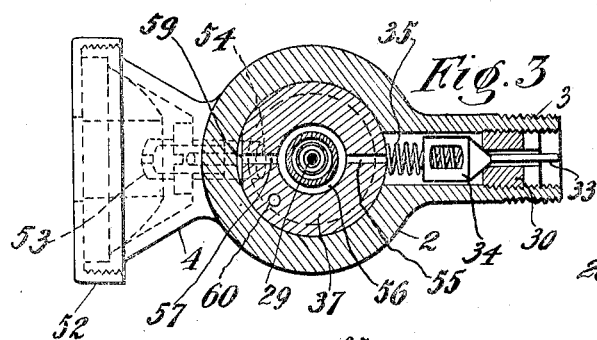
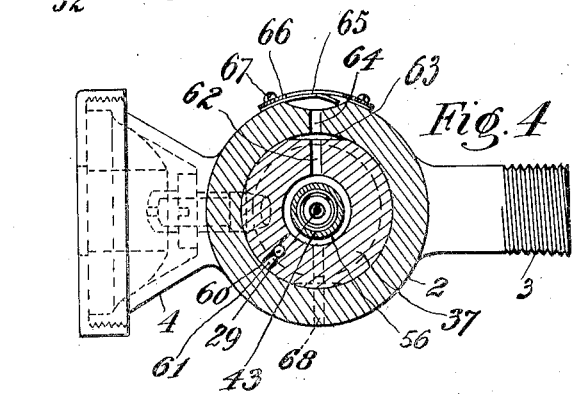
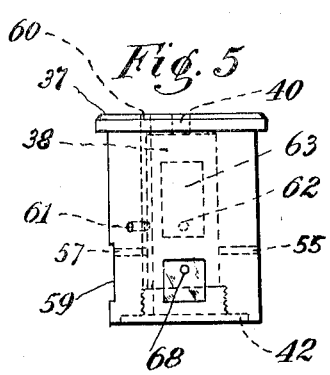
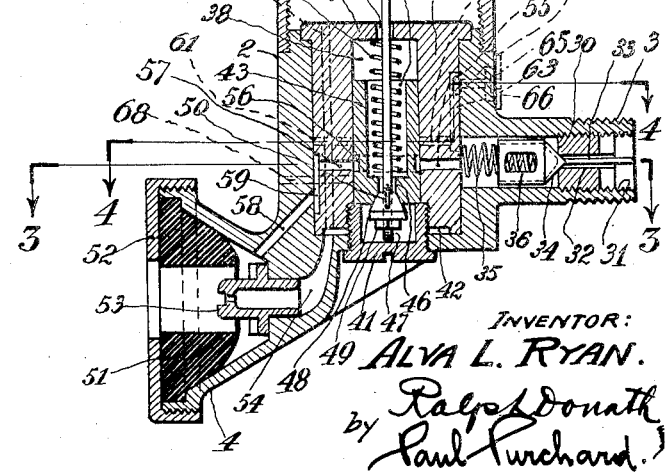
INVENTOR:
ALVA L. RYAN.
by Ralph Donath
Paul Burchard
Attorneys.

Patented July 19, 1927.

1,636,077

UNITED STATES PATENT OFFICE.

ALVA L. RYAN, OF PITTSBURGH, PENNSYLVANIA, ASSIGNOR OF ONE-HALF TO WILLIAM J. ARTZ, OF PITTSBURGH, PENNSYLVANIA.

PRESSURE GAUGE.

Application filed May 25, 1926. Serial No. 111,511.

This invention relates to pressure gauges and more particularly to gauges used in connection with automobile tires.

The primary object of this invention is to provide a tire pressure gauge which is adapted to indicate the actual pressure existing in a tire, regardless of the pressure of the air in the supply hose furnishing the inflating air. Another object of this invention is to provide a pressure gauge which automatically cuts off the air supply after a predetermined and desired pressure has been reached within the tire. A further object is to provide a pressure gauge adapted to give an audible warning signal as soon as the air pressure within the tire exceeds the predetermined amount. Still another object is to provide a pressure gauge which is positive in action, compact and which can be manufactured at relatively low cost. Additional features and advantages of this invention will appear from the following description considered in connection with the accompanying drawing forming part of this application, and in which:

Fig. 1 represents, in an enlarged scale, a longitudinal section through a tire pressure gauge built in accordance with my present invention.

Fig. 2 is a top view of Fig. 1.

Fig. 3 is a cross-section taken on line 3—3 in Fig. 1.

Fig. 4 is a cross-section taken on two parallel planes indicated by the line 4—4, also in Fig. 1.

Fig. 5 is a detailed view showing the valve bushing of the pressure gauge in elevation.

The purpose of this application is to cover various important improvements over the construction of a pressure gauge for which I was granted Letters Patent No. 1,530,093, on March 17th, 1925.

Referring to the drawing, the body of my improved pressure gauge consists of an outer shell 1, threaded inwardly to within a short distance of its top end. Screwed into the lower portion of this shell is the base portion 2 having cast thereon the air-inlet nipple 3 and the tire valve coupling member 4. Within the shell is the open adjusting sleeve 5 the lower end 6 of which is slightly enlarged and threaded to engage the threads of the shell, whereby said sleeve may be adjusted longitudinally. Slidable inside the adjusting sleeve is the indicator-cap 7, closed at the top, and having an enlarged portion 8 which fits snugly within said sleeve.

Centrally disposed within the indicator-cap is a calibrated coiled wire spring 9 inside of which is an expansible tube 10, preferably made of very resilient rubber, closed at the top and having at its lower end an outside flange 11. The upper end of this spring bears against the top 12 of the indicator-cap, whereas the lower end thereof is secured to the adjusting-sleeve 5, near the bottom thereof, by means of an outwardly threaded ring 13 which engages the inside threads 14 cut in the adjusting sleeve. This ring is partly counterbored to provide a seat 15 for the spring 9 and has a collar 16 which is pressed around the lower turns of the spring, to securely hold it.

The flange of the rubber tube 10 is clamped between the flat bottom of the ring 13 and a loose ring 17 which is held in place by means of an outwardly threaded nut 18, also engaging the inside thread of the adjusting-sleeve. To facilitate the application of said nut, suitable slots or notches 19 are cut in the base thereof for inserting a flat screw-driver or similar tool. As shown in Fig. 1, a thin metallic flanged ferrule 20 is preferably inserted at the flanged end of the rubber tube to protect the latter and keep it from collapsing.

The rubber tube and indicator-cap are clamped together at the top by means of a special bolt comprising a threaded shank 21 and a head 22, and by a nut 23 in which the shank engaging aperture is drilled and tapped only partly through to prevent any air leakage. The head 22 of this bolt is counterbored at 24 to receive the loosely fitting upper end of the open guide-tube 25 which is suspended therefrom by means of a loose pin-connection 26. The lower opening 27 of this tube is restricted to prevent the passage therethrough of the head 28 of the plunger-rod 29 which is guided for longitudinal movement by and within said guide-tube. The purpose of freely suspending the guide-tube from the head 22 is to make the engagement between said tube and plunger-rod self-adjusting and, therefore, prevent the binding of said parts.

The air controlling mechanism of this gauge is all located substantially within the base portion 2. In the inlet-nipple 3 is mounted the air-inlet valve which comprises a seat 30 which is screwed into the threaded portion 31 of the nipple and which has a central aperture 32 that is loosely engaged by the push-pin 33 of the slidable, hollow, cylindro-conical valve disc 34. The latter is normally pressed against its seat by a spring 35 and has at its side one or more openings 36 to facilitate the admission of the inflating air into the gauge and the tire. One end of this spring extends within the valve-disc and is guided thereby, whereas the other end bears against the side of the valve-bushing 37 which fits snugly in the base 2. This bushing has a central bore 38 that extends to within a short distance from the top 39 in which a clearance hole 40 is provided for the plunger-rod 29. The lower end of the bore 38 is threaded to receive a threaded hollow plug 41 by means of which the bushing is securely held in the base portion. The bottom end of the bushing is slightly counterbored to produce an annular air-chamber 42.

Fitting closely in the bore 38 is the slidable plunger 43 which is centrally counterbored to two diameters, the larger bore 44 serving as a receptacle for the plunger-spring 45 and the smaller bore 46 being engaged by the lower, threaded, end 47 of the plunger-rod. The upperward movements of the latter are communicated to the plunger by means of the nut 48 and the lock-nut 49, the former having a cross-wise slot 50 to equalize the air pressure on both sides of the plunger.

The gauge is connected to a tire-valve by means of the valve-coupling 4, of well known design, and which comprises a rubber coupling 51, held in place by the threaded cap 52 and a hollow button 53 by means of which the push-pin of the tire valve (not shown) is depressed to let air into the tire. This button is fastened in the duct 54 which terminates within the air-chamber 42.

In the bushing 37 and base 2 are provided three sets of air passages which are all controlled by the plunger 43, which in turn is governed by the air pressure within the tire. These air passages are all indicated in Fig. 1 in solid and dot and dash lines although they occupy different planes, as shown in Figs. 3, 4 and 5.

The first set of air passages serves to introduce inflating air directly into the tire, as is shown in solid lines in Fig. 1. When the gauge is used on a tire to be inflated, the air supply-hose (not shown) is applied to the inlet-nipple 3, whereby the valve push-pin 33 and the valve-disc 34 are depressed and the inflating air enters the port 55, cut radially in the bushing 37 and follows the groove 56 cut around the plunger 43, the latter occupying at this time its lowermost position shown in Fig. 1, wherein said groove communicates with the port 55. Thence the air enters another radial port 57 situated at the same level as port 55, and it finally goes into the coupling-member and the tire by way of the inclined port 58 which communicates with port 57 through the air space formed by filing the flat area 59 on the bushing. It will be observed that the inflating air passes into the tire without entering the valve-body proper. The gauge is therefore not submitted directly to the pressure in the supply-hose, which pressure may sometimes be much greater than that required in the tire; this is especially the case with so-called "balloon"-tires working under low pressure.

The air compressed within the tire communicates with the inside of the pressure gauge by way of the button 53, duct 54 and the longitudinal port 60, the lower end of which reaches into the air-chamber 42. On account of this air pressure, the expansible inner tube is extended and carries along the indicator-cap 7 and the guide-tube 25. As the desired pressure in the tire is reached, the restricted lower end of the guide-tube comes in contact with the head 28 of the plunger-rod 29, thereby raising the plunger 43 until the groove 56 passes beyond the inlet-port 55 and the latter is closed by the lower part of the plunger. As this occurs, the plunger groove comes in line with the second set of port-holes 61 and 62, the former connecting with the longitudinal port 60 and the latter, by way of the flat area 63 and the port 64, allowing the air to vibrate a reed 65 mounted outwardly on the base and secured thereon by means of a frame 66 and the screws 67. The sounding of this reed will inform the person using the gauge that the tire has been inflated to the desired pressure.

The third set of port-holes is only used as a safety device and comes into play only in case that an operator should fail to hear the warning signal of the reed and in case that there should be a leakage at the lower end of the plunger. In this instance, the operator would keep on holding the pressure-hose to the gauge and the high pressure would enter through the leaking parts of the gauge into the tire and overcharge the latter. However, any appreciable overcharge would be prevented by the fact that the plunger would be raised still more until the lower end thereof would fully expose the third set of ports which consists of a single port 68 drilled through one side of the body and the bushing. Any additional air forced into the tire would, of course, escape into the atmosphere through said port.

The outward travel of the adjusting-sleeve within the shell 1 is limited by the unthreaded portion provided in the upper part of the latter. Any leakage of air between said sleeve and shell is prevented by means of a packing-ring 69 which is placed at the top of the shell. This packing is compressed by means of an inwardly threaded ferrule 70 which engages suitable threads 71 cut outwardly on the shell and which acts upon a beveled and resilient metallic follower-ring 72. The lower end of the ferrule is preferably counterbored and bent in over the lower end of thread 71, as shown by numeral 73, to prevent its loss; sufficient play being, of course, provided to permit proper adjustment on the packing-ring.

Upon the indicator-cap and the adjusting-sleeve are placed oppositely marked scales 74 and 75 having reference to the air pressure within the tire. The method of adjusting the pressure-gauge to operate at a certain pressure is as follows:—

Referring to Fig. 1 and assuming that an air pressure of about fifty-five pounds be desired in the tire, the ferrule 70 is first loosened a little to unlock the adjusting-sleeve 9 and the latter is then screwed down into the gauge until the scale 75 reads fifty-five pounds. As the air enters the gauge, the pressure indicating-cap 7 which, up to that time has been forced down to the zero reading by the coil-spring 9, will now gradually rise, owing to the stretching of the rubber-tube, until it reads fifty-five pounds of pressure. At this moment the restricted end 27 of the guide-tube 25 will engage the head 28 of the plunger-rod 29, whereby the plunger 43 is raised with the results explained above. As will be understood, the lengths of the guide-tube and plunger-rod must be definitely established to assure the correct operation of the gauge. Slight adjustments may be obtained by means of the nuts 48 and 49.

The device may also be used like an ordinary tire-pressure-gauge, i. e. (independently of the air supply hose) to indicate the pressure prevailing in a tire. To do this, the adjusting-sleeve is screwed down to a pressure greater than the one expected in the tire. The gauge is then applied to a tire valve and the pressure in said tire will be indicated directly by the scale 74 on the indicator-cap 7.

As will be understood, there may be slight changes made in the construction and arrangement of the details of my invention without departing from the field and scope of the same, and I intend to include all such variations, as fall within the scope of the appended claims, in this application in which the preferred form only of my invention has been disclosed.

I claim:—

1. A pressure gauge comprising a body portion and a base therefor; inlet and outlet connections; an adjustable sleeve longitudinally movable within said gauge-body; a pressure indicator movable within said adjustable sleeve; a bushing positioned within said base; a valve-plunger movable within said bushing, said bushing and plunger having cooperating passages for directing the flow of pressure to the outlet, and means for operating said plunger by the movements of said pressure indicator.

2. A pressure gauge comprising a body portion and a base therefor; inlet and outlet connections; an adjustable sleeve longitudinally movable within said gauge-body; a pressure indicator movable within said adjustable sleeve; a bushing positioned within said base; a valve-plunger movable within said bushing, said bushing and plunger having cooperating passages for directing the flow of pressure to the outlet, and adjustable means for operating said plunger by the movements of said pressure indicator.

3. A pressure gauge comprising a body portion and a base therefor; inlet and outlet connections; an adjustable sleeve longitudinally movable within said gauge-body; a pressure indicator movable within said adjustable sleeve; a bushing positioned within said base; a valve-plunger movable within said bushing, said bushing and plunger having cooperating passages for directing the flow of pressure to the outlet; a guide-tube and means for freely suspending the same within said pressure indicator; a plunger-rod movable within said tube and guided thereby, and connecting means cooperating with said tube and plunger-rod for actuating said plunger by the movements of said pressure indicator.

4. A pressure gauge comprising a body portion and a base therefor; inlet and outlet connections; an adjustable sleeve longitudinally movable within said gauge-body; a pressure indicator movable within said adjustable sleeve; a bushing positioned within said base; a valve-plunger movable within said bushing, said bushing and plunger having cooperating passages for directing the flow of pressure to the outlet; a guide-tube and means for freely suspending same within said pressure indicator; a plunger-rod movable within said tube and guided thereby; connecting means cooperating with said tube and plunger-rod for actuating said plunger by the movements of said pressure indicator, and means for automatically returning said plunger into normal position.

5. A pressure gauge comprising a body portion and a base therefor; inlet and outlet connections; an adjustable sleeve longitudinally movable within said gauge-body; a pressure indicator movable within said adjustable sleeve; a bushing positioned within said base; a valve-plunger movable within said bushing, said bushing and plunger having cooperating passages for directing the flow of pressure to the outlet; a guide-tube and means for freely suspending same within said pressure indicator; a plunger-rod movable within said tube and guided thereby; connecting means cooperating with said tube and plunger-rod for actuating said plunger by the movements of said pressure indicator, and resilient means for automatically returning said plunger into normal position.

6. A pressure gauge comprising a body portion and a base therefor; inlet and outlet connections positioned on said base; an adjustable sleeve longitudinally movable within said gauge-body; a pressure indicator movable within said sleeve; a bushing positioned within said base; a valve-plunger movable within said bushing; said bushing and plunger having a plurality of groups of cooperating passages for directing the flow of pressure in various directions; a guide-tube and means for freely suspending same within said pressure indicator; a plunger-rod movable within said tube and guided thereby, and connecting means cooperating with said tube and plunger-rod for lifting said plunger by the movements of said pressure indicator.

7. A pressure gauge comprising a body portion and a base therefor; inlet and outlet connections positioned on said base; an adjustable sleeve longitudinally movable within said gauge-body; a pressure indicator movable within said sleeve; a bushing positioned within said base; a valve-plunger movable within said bushing; said bushing and plunger having a plurality of groups of cooperating passages for directing the flow of pressure in various directions according to the position occupied by said plunger; a guide-tube and means for freely suspending same within said pressure indicator; a plunger-rod movable within said tube and guided thereby; connecting means cooperating with said tube and plunger-rod for lifting said plunger by the movements of said pressure indicator, and sound producing means adapted to be operated by said fluid pressure.

In testimony whereof I affix my signature.

ALVA L. RYAN.